United States Patent [19]

Underberg et al.

[11] Patent Number: 4,504,496

[45] Date of Patent: Mar. 12, 1985

[54] PROCESS FOR IMPROVING THE FLAVOR AND/OR THE MOUSSEUX OF SPARKLING WINES AND SPARKLING WINES PRODUCED ACCORDING TO SAID PROCESS

[75] Inventors: Emil E. J. Underberg, Dietlikon, Switzerland; Andreas F. Lembke, Eutin-Sielbeck, Fed. Rep. of Germany

[73] Assignee: Underberg-Handels AG., Dietlikon, Switzerland

[21] Appl. No.: 115,575

[22] Filed: Jan. 25, 1980

Related U.S. Application Data

[63] Continuation of Ser. No. 925,669, Jul. 18, 1978, abandoned.

[30] Foreign Application Priority Data

Jul. 19, 1977 [CH] Switzerland .................. 8945/77

[51] Int. Cl.$^3$ ............................................. C12C 11/00
[52] U.S. Cl. ........................................ 426/11; 426/15; 426/534; 426/592; 426/656
[58] Field of Search ................... 426/11, 15, 534, 592, 426/656, 72

[56] References Cited

U.S. PATENT DOCUMENTS

| | | | |
|---|---|---|---|
| 2,908,574 | 10/1959 | Luthi | 426/15 |
| 3,066,025 | 11/1962 | Simkin | 426/15 |
| 3,558,325 | 1/1971 | Recsei | 426/592 |

OTHER PUBLICATIONS

Amerine et al., *The Tech. of Wine Making*, (1972), pp. 457–484.

*Primary Examiner*—Peter Chin
*Attorney, Agent, or Firm*—Ladas & Parry

[57] ABSTRACT

A process for improving the flavor and/or the mousseux of sparkling wines is described. Sparkling wines are wines which contain a permanent visible excess of carbon dioxide, like champagne, Sekt, crackling wines and vino spumante. Of said sparkling wines the most preferred organoleptic properties, i.e. flavor, fragrance and taste, which is also influenced by the special properties of the excess carbon dioxide of said sparkling wines, and also the most desirable formation of small carbon dioxide bubbles when the bottle is opened, i.e. the most preferred mousseux, have such sparkling wines which are prepared according to the time consuming and very expensive champagne method. In the present process the flavor and/or the mousseux of any kind of sparkling wines, i.e. those prepared according to the champagne method, and also those which are prepared according to far cheaper methods, is highly improved by adding at least one material selected from the following group of materials, which comprises: amino acids, amino acid derivatives, thiamine (vitamin $B_1$) and thiamine-pyrophosphoric acid salt (thiamine diphosphate salt). A special preferred product which is added is a hydrolysate of a protein containing material, preferably an autolysate of yeasts. Said material can be added in any step of the process for making the sparkling wines, prior to the final corking of the filled bottles.

17 Claims, No Drawings

PROCESS FOR IMPROVING THE FLAVOR AND/OR THE MOUSSEUX OF SPARKLING WINES AND SPARKLING WINES PRODUCED ACCORDING TO SAID PROCESS

This is a continuation of application Ser. No. 925,669 filed July 18, 1978, now abandoned.

BACKGROUND OF THE INVENTION

1. FIELD OF THE INVENTION

This invention relates to a method of improving the flavour and/or the mousseux of any kind of sparkling wines by adding amino acids, amino acid derivatives, thiamine and/or thiamine pyrophosphoric acid salt or a material which contains two or more of such substances.

2. DESCRIPTION OF THE PRIOR ART

Wines containing a permanent visible excess of carbon dioxide are called sparkling wines. The nomenclature of the sparkling wines is most complicated. The most famous name "champagne" may be used in some countries only for such products produced in the region of said name in France. Generally, for wines containing a permanent visible excess of carbon dioxide which are produced outside the champagne region of France and made according to cheaper methods than the traditional champagne method, the term "champagne" must not be used and sparkling wines of said kind are e.g. called Sekt, Vin mousseux, Vino spumante, and so on. In the present description the term "sparkling wine" is used to mean any kind of wines conaining a permanent visible excess of carbon dioxide, independent whether said carbon dioxide is produced by a secondary fermentation of sugar or whether it is introduced into the wine by any other method, like e.g. pressing carbon dioxide gas into a wine. Accordingly, with the term "sparkling wine" there are to be understood herein also products which are named "crackling wines" in the United States of America or "vin pétillant" in France, or "Perlweine" in Germany. The special organoleptic properties of any sparkling wines are influenced by the method according to which they are produced, and also by the aging of the sparkling wine, especially if they are produced by a secondary fermentation of sugar.

Those products which are most preferred as to their organoleptic properties, i.e. flavour and fragrance, and also as to their mousseux (i.e. the properties of the carbon dioxide contained in the sparkling wine, i.e. the bubble forming properties and foaming properties when the bottle is opened) are those sparkling wines which are prepared according to the traditional champagne method.

The traditional champagne method uses as starting material a wine which is produced by an alcoholic fermentation of musts, i.e. grape juice, which alcoholic fermentation is also called primary fermentation. The primary fermentation of said wine should be complete, that is no sugar should remain in the wine used for making champagne. Furthermore, the wine used for the production of champagne should be rich in acids, it however should have a low volatile acidity, a fruity taste, a white unoxidized colour and a freedom from all undesired odors and tastes. The acid content of the wine should be 6–8% o, corresponding about to a pH-value of 3.0–3.4, and the alcohol content should be in the range of 10–11.5% by volume. One single wine generally does not fullfill all those requirements and therefore as starting material generally a blend of wine is used. To said blend of wines, named Cuvée, there is added a mixture of yeast and sucrose or invert sugar, named tirage. Usually there are added about 24–30 g of sucrose or invert sugar per liter of wine, and the so resulting mixture is then filled into special bottles capable of withstanding a pressure of at least 8 atm, the bottles are sealed, preferably by using a large special cork, and the secondary fermentation is performed in said closed bottles. During the secondary fermentation the added sugar or invert sugar is fermented to form ethanol and carbon dioxide, and as the bottles are closed the carbon dioxide cannot escape from the liquid and remains dissolved in the wine. The wine is aged in the bottles in contact with the yeast for at least 60 days, if however a sparkling wine having an especially good taste and mousseux is prepared, said secondary fermentation is performed for 6 month until 2 or 3 years, since the quality of the sparkling wine improves during this aging in contact with the yeast.

After said aging period the bottles are placed into special racks, and during a period of about 3 to 4 weeks, e.g. 34 days, the bottles are gradually declined in said racks and shaked, so that the bottles are finally in a nearly upside down position in said racks. During the declining and shaking of the bottles in said special racks the bottles are also twisted, generally each day the bottle is twisted around its longitudinal axis for about 45° ($\frac{1}{8}$ of the circumferential circle of the bottle). During said treatment the yeast generally deposits down onto the cork of the bottle and in the neck. Due to this deposition of the solids, the supernant wine generally gets clear and light. As soon as this is achieved the deposit must be removed. To minimize decreases in this pressure and losses of wine when the cork is removed, the bottles are chilled and the yeast which is deposited in the neck of the bottle is frozen solid by submerging it in a ice-salt mixture or in special freezers. At this temperature the pressure is reduced considerably and when a skilled specialist opens the sealed bottle by removing the cork, the solid plug is ejected, carrying with it the yeast deposit. This step is called "disgorging". To the so resulting raw sparkling wine, which also is called "brut", there is now added the "dosage", i.e. a mixture of sucrose in an alcoholic solution, like e.g. a wine, a brandy or a cognac saturated with sugar. After said "dosage" is added, the bottles are finally closed and aged. Depending whether a "dry" or "sec" sparkling wine, a "demi-sec" sparkling wine or a "sweet" or "doux" sparkling wine shall be produced, there are added such quantities of the dosage that the resulting sparkling wine contains 10–30 g of sucrose per liter sparkling wine.

This traditional champagne method for producing sparkling wines results, if performed properly, in sparkling wines having the most desired organoleptic properties and the typical "bouquet" of champagne or Sekt. Said organoleptic properties are of course dependent to some extent from the wine or blend of wines used as starting material, but still more influenced by the ageing of the raw sparkling wine in contact with the yeast.

Sparkling wines prepared according to said traditional champagne method are very expensive, because of the long ageing periods and the time consuming manual work which has to be performed by specialists.

Several methods therefore have been developped in order to produce a sparkling wine cheaper and avoiding the long ageing periods involved with the traditional champagne method.

One of said methods is the so called "transvasing procedure". In this process the secondary fermentation of the wine or blend of wines after the mixture of yeast and sucrose or invert sugar is added is also performed in closed bottles. Generally the wine is kept in contact with the yeast during this secondary fermentation for about 6 to 8 weeks. In this process however the laborous process of depositing the yeasts in the neck of the bottle and on the cork as well as also the complicated disgorging procedure, in order to remove the yeast deposits is avoided by transferring the content of the bottles including the yeast in a special apparatus called "transvasing apparatus". In this apparatus the gas pressure of the bottles is carefully maintained and to the raw sparkling wine containing still the yeast, there is added the liquid containing the sucrose and the ethanol, i.e. the dosage. This dosage can e.g. be a wine, a cognac or a brandy saturated with sugar. Thereafter there is performed a filtration under a counter pressure, and performing said filtration process, the sparkling wine is drawn off into new bottles, and the new bottles are closed, labelled and shipped. In the step of filtration performed under a counter pressure (counter pressure filtration), generally a pressure in excess of atmospheric pressure of 4.6 atm, i.e. a pressure of 65.4 psig is applied.

A very important disadvantage of the production of sparkling wine according to the traditional champagne method, and also according to the above transvasing process is the risk of bottle breakage during the performance of the secondary fermentation. Bottle breakage is due to defective bottles, and it also occurs when the blend of wines is not properly mixed with the tirage, i.e. the material containing yeast and sugar, so that some bottles receive too much sugar. Because of this excess sugar during the secondary fermentation a higher pressure of carbon dioxide is developed and the bottles break or the cork is ejected.

The above difficulties can be avoided if the sparkling wine is produced by performing the secondary fermentation in a pressure tank. This tank method is cheaper and less hazardous, because in the tank the temperature can be easily controlled by cooling means or heating means and the excess pressure can be allowed to escape. The tank method is performed by adding to the wine or the blend of wines, i.e. to the Cuvée, the tirage comprising yeast and sugar or invert sugar. The secondary fermentation is performed in a pressure tank which generally has a capacity of 500-20,000 liters. The longitudinal axis of said tank can be in horizontal or vertical position, and in the latter case the tank can be easily stirred. Generally the pressure tank is also provided with a water jacket which makes it possible to control the temperature of the tank content during the secondary fermentation by cooling or warming the tank. The secondary fermentation is finished in the pressure tank and the secondary fermentation generally requires about 21 days. After the secondary fermentation there is generally performed a fining or clarifying of the sparkling wine, in order to facilate the separation of the excess of tartrates. If the tank in which the fermentation is performed is provided with a water jacket, then the deposition of the tartrates can be accelerated and facilitated by cooling the sparkling wine in the pressure tank. Such a cooling is also advantageous because if the excess of tartrate is already removed in this step, then a seperation of tartrate from the finished sparkling wine renders unnecessary. After the clarifying step to the sparkling wine there is added the dosage, i.e. the liquid mixture containing the sucrose and the ethanol, e.g. the saturated solution of sucrose in wine or in brandy or in cognac. After the yeast is removed by a filtration applying a counter pressure and during this filtration process the sparkling wine is racked into the bottles applying also a counter pressure. The so filled bottles are then finally closed and submitted to an aging of shorter or longer duration.

A still more economical process for the preparation of sparkling wines is the carbonation method. In this process instead of using the costly process of the secondary fermentation to secure an excess of carbon dioxide in the wine, the carbon dioxide gas as such is added to the wine by impregnation. In said carbonation process accordingly, the step in which the mixture of yeast and sucrose or invert sugar is added to the blend of wines is omitted, and the blend of wines which generally has been clarified by filtration is impregnated under steril conditions with the carbon dioxide. Prior to this impregnation performed in a carbonation apparatus there is generally added to the blend of wines the dosage, i.e. the liquid containing ethanol and sucrose, like a saturated solution of sucrose in wine or in brandy. The main problem in the carbonation process is to secure a good impregnation of the gas in the wine. This can be e.g. accomplished by a counterflow of wine and gas over glass balls or by water carbonation techniques. In the carbonation apparatus there is generally applied carbon dioxide until a carbon dioxide pressure in the wine of 4-6 atm is achieved. Sparkling wines produced according to the carbonation method are generally filled into the same kind of bottles using the same type of cork as for sparkling wines produced according to any of the processes applying a secondary fermentation. In most countries however there has to be stated on the label of the bottle that the sparkling wine is produced by the artificial addition of carbon dioxide.

Sparkling wines having a lower content of carbon dioxide than the sparkling wines prepared according to the above discussed processes are those, which are named in the United States of America "crackling wine", in Germany "Perlwein" and in France "Vin pétillant". In Germany, the designation "Perlwein" is used for sparkling wines having an visible excess of carbon dioxide of 1 atm gauge (14.2 psig) at a temperature of 10° C.

It is possible to produce such sparkling wines having a lower content of carbon dioxide, which are in the following designated as "crackling wines" by performing a secondary fermentation of wine in the pressure tank. In this case there is added a mixture of yeast and sucrose or invert sugar to the wine, however generally less sucrose is added, e.g. a quantity of 4-6 g of sucrose per liter of wine. Thereafter the secondary fermentation is performed in the tank as described above. Furthermore, it is also possible to to produce crackling wines by performing the above stated carbonation method, i.e. by impregnating a wine with carbon dioxide gas. The most usual process for the preparation of sparkling wines belonging to the class of crackling wines is to produce the excess of carbon dioxide in the wine by performing the primary fermentation of the musts (grape juice) by applying a pressure. If the primary fermentation of the musts is performed in a controlled way by using a pressure tank, then the carbon dioxide which is produced in this primary alcoholic fermentation remains in the wine. The glucose of the musts is converted by the primary fermentation into ethanol and carbon dioxide, and the pressure tank used for this process prevents that the carbon dioxide can escape from the produced wine, and it therefore remains as excess of carbon dioxide in the wine.

Expensive research work which has been performed in the field of the production of any kind of sparkling wines, including the above described crackling wine, has shown that the typical flavour of champagne and Sekt, i.e. the bouquet of the sparkling wine, is mainly dependent from the contact time of the sparkling wine with the yeasts and not so much dependent from the blend of wines used as starting material. If e.g. the same blend of wines is used and the same kind and quantity of tirage, i.e. the same mixture of yeasts and sugar, is added and the so resulting material submitted to the secondary fermentation, then the flavour and also the mousseux of the produced sparkling wines is dependent from the special performance of the secondary fermentation, i.e. whether it is performed according to the traditional champagne method, according to the transvasing process or according to the tank process. By far the best flavour or bouquet and also the best mousseux is achieved if the secondary fermentation is performed according to the time consuming and expensive traditional champagne method.

The flavouring components, i.e. the substances which are responsible for the bouquet of the sparkling wine were analysed and the results achieved showed that if the contact between the yeast and the sparkling wine during the secondary fermentation is prolonged, then the resulting sparkling wines have a higher content of amino acids. Said amino acids during the ageing procedure are converted partially to aldehydes, partially to alcohols and acids. A longer aging period can result in that the concentration of some alcohols and aldehydes is gradually reduced in the sparkling wine. Such research work e.g. has shown that gradually the concentraton of isobutanol and isopentanol in the sparkling wine is diminished while on the other hand the concentration of heptanol gradually increases.

SUMMARY OF THE INVENTION

It is an object of the invention to develop a process for preparing a sparkling wine having the desired typical flavour and mousseux of champagne by applying more economical processes than the traditional champagne method. A further object is to improve also the organoleptic properties of sparkling wine prepared according to the traditional champagne method avoiding excessive contact periods between the sparkling wine and the yeast.

It is yet an other object of the invention to prepare a sparkling wine by one of the cheap methods, i.e. by providing the visible excess of carbon dioxide in the wine by impregnating a blend of wines with carbon dioxide gas or by performing the primary alcoholic fermentation of the musts in a pressure tank, and to gain nevertheless a product which has the typical organoleptic properties and mousseux of sparkling wines produced according to the far more costly process of the secondary fermentation, especially according to the traditional champagne method.

Unexpectedly it was now found out that the aimed objects can be achieved by adding in any step of the preparation paration of the sparkling wine prior to the final bottling of the product at least one amino acid, amino acid derivative, thiamine, thiamine pyrophosphoric acid salt or a mixture containing two or more such components.

Accordingly, there is provided a process for improving the flavour and/or the mousseux of sparkling wines, i.e. of any kind of wines conaining a permanent visible excess of carbon dioxide, in which process in a step of the preparation of the sparkling wine there is added at least one material selected from the following group of materials, which comprises: amino acids, amino acid derivatives, thiamine (vitamine $B_1$) and thiamine pyrophosphoric acid salt (thiamine diphosphate salt).

According to a preferred embodiment of the inventive process, there is added during the preparation of the sparkling wine a product which results from the hydrolysis of a protein containing material. Such hydrolyzation products generally contain a mixture of amino acids and generally furthermore amino acid derivatives, like dipeptides, tripeptides and polypeptides.

According to an especially preferred embodiment of the invention there is added a mixture which comprises amino acids and/or amino acid derivatives, and furthermore thiamine and/or thiamine phosphate. A specially preferred product of said kind is an autolysate of yeasts.

The inventive process makes it possible to improve the organoleptic properties and/or the mousseux of any sparkling wine, independently whether the sparkling wine is produced according to the above described traditional champagne method, the transvasing process, the pressure method, the carbonation method or the method performing the primary fermentation of the musts in a pressure tank. Compared with a product prepared according the same way, however omitting the adding of amino acids, amino acid derivatives, thiamine and/or thiamine pyrophosphoric acid salt, the product of the inventive process will always have organoleptic properties which are more similar to the flavour and other organoleptic properties typical for champagne than the corresponding product produced without the addition of the stated amino acids or thiamine or thiamine derivative.

If the sparkling wine is prepared by adding to wines or a blend of wines a mixture of sucrose or invert sugar and yeast, then the following steps have to be performed independently whether the special process is performed according to the champagne method or the transvasing method or the pressure tank method:

(a) to wines or a blend of wines, which were produced by an alcoholic fermentation (primary fermentation) of musts (grape juice), there is added the tirage, i.e. the mixture of yeast and sugar;

(b) the resulting mixture is submitted in a closed container to the secondary fermentation, which closed container is a closed bottle if either the traditional champagne method or the transvasing process is performed, or which is a pressure tank if the tank process is performed. By using the closed container the carbon dioxide formed during said secondary fermentation remains in the wine;

(c) maintaining essentially the carbon dioxide content of the wine, after the finishing of the secondary fermentation and optionally after an ageing the yeasts are removed from the sparkling wine, and either before or after the removal of the yeasts there is added to the sparkling wine the dosage, i.e. a mixture containing sugar and ethanol;

(d) finally the sparkling wine which is contained in the special bottles (if the traditional champagne method was performed) or which was filled into the special bottles (if the transvasing process or the pressure tank process was performed) is finally closed and ready for being further stored or shipped.

When the inventive process is performed, the material selected from the group of material which comprises amino acids, amino acid derivatives, thiamine and thiamine derivatives (thiamine pyrophosphoric acid salt) has to be added at any desired time prior to or together with the performance of the step (d), i.e. the step in which the sparkling wine is filled into the bottles and the bottles are finally closed. In order to avoid any additional process steps, it however is advantageous to add the amino acids, amino acid derivatives, thiamine and/or thiamine derivative, either together with the tirage, i.e. in the step (a) of the above described process, and/or together with the dosage, i.e. in the step (c) of the above outlined process.

In several countries special legal regulations have to be drawn into consideration if products shall be prepared which may be denominated as "high quality sparkling wine", "champagne" or "Sekt". According to the legal regulations of Western Germany (Federal Repulic of Germany) e.g. a high quality sparkling wine, like "Sekt" has to be submitted to a secondary fermentation of at least 60 days (the minimum contact time between the yeasts and the sparkling wine has to be 60 days), and the minimum time for the production (including the ageing process) has to be 9 months. According to the legal regulations of Western Germany, furthermore sparkling wine prepared according to the cheaper tank process has to have a minimum contact time of the sparkling wine with the yeast of 21 days. From the technical point of view, it however would be possible to finish the secondary fermentation more rapid, especially if the fermentation tank is warmed a little bit up using a water jacket. If not prevented by legal restrictions, it therefore is also possible to produce a sparkling wine according to the tank fermentation which only 8–10 days.

If the sparkling wine is produced according to the traditional champagne method, then the additives to be used in the inventive process, i.e. at least one material selected from the group of materials comprising amino acids, amino acid derivatives, thiamine and/or thiamine pyrophosphoric acid salt, preferably an autolysate of yeasts, are either added together with the tirage, i.e. the mixture of yeast an sugar used for performing the secondary fermentation, and/or added together with the above stated dosage, i.e. the sucrose containing ethanol solution which is added after the degorging process. The additives used in the inventive process result in an essential improvement of the organoleptic properties, like bouquet and flavour, and also in the properties of the visible carbon dioxide of the sparkling wine, i.e. its mousseux, in a sparkling wine which is prepared according to the traditional champagne method, compared with a corresponding sparkling wine prepared without adding the materials in question. If the inventive additives, and preferably an autolysate of yeast, is added then it e.g. is possible to produce a champagne if the content period between the yeast and the raw sparkling wine is only 60 days, which is in its quality equal or even superior to a champagne produced in an analogous way, however with a prolonged contact time between the yeast and the raw sparkling wine of e.g. 6 months to two years, which sparkling wine however is produced without adding the inventive additives. In spite of the fact that amazing advantages are achieved using the inventive additives if the sparkling wine is produced according to the traditional champagne method, nevertheless the improvement of flavour and mousseux is generally still more remarkable if the sparkling wine is produced according to one of the cheaper production procedures, like e.g. according to the pressure tank process. Until now it was not possible to produce a sparkling wine according to the more economical pressure tank process which was equivalent with regard to its organoleptic properties and with regard to the mousseux to a sparkling wine produced according to the traditional champagne method. The additives used in the inventive process however make it possible to produce a sparkling wine according to the far more economical pressure tank procedure which is hardly distinguishable as to its organoleptic properties and mousseux from a sparkling wine produced according to the traditional champagne method.

If the sparkling wine is either produced according to the transvasing process or according to the pressure tank procedure, then, as explained before, the yeast is removed from the sparkling wine after the termination of the secondary fermentation by performing a filtration applying a counter pressure. In the course of said counter presure filtration, in both case the product is filled into the bottles, and the bottles are closed. Therefore, if a sparkling wine is produced applying the transvasing process or the pressure tank process, then the inventive additives have to be inserted into the process prior to the performance of the filtration under counter pressure. In order to avoid that an additional working step is involved when the inventive process is applied to a sparkling wine production according to the transvasing procedure or the pressure tank procedure, it generally is preferred to add in said processes the material selected from the group comprising amino acids, amino acid derivatives, thiamine and thiamine derivatives, either together with the tirage and/or together with the dosage.

Until now sparkling wines which were produced according to a process in which the secondary fermentation is omitted, e.g. either by carbonation of wine with carbon dioxide gas, or by performing the primary alcoholic fermentation of the musts in a pressure tank, showed organoleptic properties which were clearly different from the desired organoleptic properties of a sparkling wine produced according to the traditional champagne method. The inventive process makes it possible to improve the flavour and the mousseux of sparkling wine produced according to said rather economic procedures, so that it closely resembles the organoleptic properties and mousseux of sparkling wines produced according to the traditional champagne method. If the sparkling wine is produced according to the carbonation process, then it is preferred to add the materials selected from the group comprising amino acids, amino acid derivatives, thiamine and thiamine pyrophosphoric acid salt, and preferably an autolysate of yeast, prior to the impregnation of the wine with the carbon dioxide gas. As generally also to a sparkling wine prepared according to the carbonation process there is added, prior to the impregnation with the carbon dioxide gas, a dosage comprising sucrose and ethanol, like e.g. a wine or a brandy saturated with sucrose, it generally is advantageous to introduce also the additives of the inventive process together with said dosage. It might be advantageous to submit the wine after the additives of the inventive process are mixed in, and also the dosage is added to an ageing for some days or weeks and to clarify the wine thereafter by filtrating it, and to introduce it then into the impregnating apparatus in which the carbon dioxide gas is pressed into the wine and the product filled into the bottles.

If the sparkling wine produced according to the inventive process is one having a low content of free carbon dioxide, like the product named crackling wine in the United States of America, or "Perlwein" in Germany, and if said sparkling wine is prepared either by a secondary fermentation of sugar, preferably according to the above defined tank method, or by the carbonation process by impregnating wine with carbon dioxide gas, then the additives used in the inventive process are introduced into the wine just in the same way as was explained above for the preparation of sparkling wines having a higher content of carbon dioxide, which sparkling wines are also prepared according to the above mentioned processes, i.e. either according to the tank fermentation or according to the carbonation method. As discussed before however, sparkling wines with a low content of carbon dioxide can be also produced by performing the primary fermentation, i.e. the alcoholic fermentation of the musts, in a pressure tank. In this case the inventive process is preferably performed by adding at least one of the materials selected from the group of materials comprising amino acids, amino acid derivatives, thiamine and thiamine derivatives, and preferably a mixture containing two or more of said components, like an autolysate of yeasts, either before the alcoholic fermentation of the grape juice is performed, or after the alcoholic fermentation of the grape juice is performed in the pressure tank. In any case of course, the materials in question have to be added before the resulting product is filled into the bottles and finally closed, and if after the performance of the alcoholic fermentation in the pressure tank the crackling wine is submitted to a clarification by filtration, it is advantageous to add the materials of the inventive process also prior to the performance of such a filtration.

Sparkling wines were produced by the processes outlined above adding at least one amino acid, amino acid derivative, thiamine or thiamine pyrophosphoric acid salt, and the resulting products were tested as to their organoleptic properties and their mousseux. Those tests showed that especially advantageous products can be produced if at least one amino acid of the following group of amino acids comprising: lysine, aspartic acid, glutamic acid, alanine and valine, or a mixture of two or more such amino acids, or a mixture of amino acids which contains an essential amount of at least one of the above stated amino acids is added. From the above mentioned preferred group of amino acids which should be added during the performance of the inventive process, the glutamic acid results in especially desirable properties of the produced sparkling wine. If therefore a mixture of amino acids is added, e.g. a hydrolysate of a protein containing material, then it is advantageous if said mixture of amino acids contains an essential amount of glutamic acid, and preferably about 50-80% by weight of the mixture of amino acids, referred to the dry weight of said mixture, should be glutamic acid. This is also true if the mixture of amino acids comprises dipeptides, tripeptides and polypeptides, and in this case the percents by weight refer to the total content of glutamic acid independently whether it is present as free glutamic acid or as a glutamic acid derivative, i.e. as glutamic acid moiety of a polypeptide.

If the inventive process is performed by adding in the course of the preparation of the sparkling wine only glutamic acid, then the flavour and the taste of the sparkling wine is clearly improved, if compared with a sparkling wine to which no amino acid has been added. The improvement of taste and flavour however is not as high as if to the product not only glutamic acid is added but a mixture containing also other amino acids or amino said derivatives.

An additive which is preferably used for performing the inventive process, because it results in a product having the most desired organoleptic properties and mousseux, which resembles to a champagne prepared according to the traditional champagne method, is, as already mentioned before, an autolysate of yeast. The autolysates of yeast comprise a mixture of amino acids and as essential component furthermore also vitamine $B_1$, i.e. thiamine, and thiamine pyrophosphoric acid salt respectively. A further component which can be found in autolysates of yeast is nicotinic acid amide, and it is believed that said component imparts in the improvement of the organoleptic properties and the mousseux of the produced sparkling wine. A further component which is present in autolysates of yeast is ergosterol, i.e. provitamine $D_2$. It might be that this product as well can impart to the advantgeous properties achieved by using an autolysate of yeast for performing the inventive process.

If the inventive process is performed by adding only thiamine or only thiamine pyrophosphoric acid salt, however no amino acid, then a high improvement of the flavour of the produced sparkling wine can be noticed, however no essential improvement of the mousseux is achieved (compared with a corresponding sparkling wine produced without any inventive additive). The best properties of the produced sparkling wine which were achieved until now resulted if a mixture of amino acid is added which is rich in glutamic acid and if as further component also thiamine or thiamine pyrophosphoric acid salt is introduced into the sparkling wine in any step of the process for making it, including also the incorporation into the starting material used for the preparation of the sparkling wine.

Generally, the inventive process is performed so that the material selected from the group comprising amino acids, amino acid derivatives, thiamine and thiamine pyrophosphoric acid salt is added in the course of the preparation of the sparkling wine in such a quantitiy, that there results a final sparkling wine which contains a total amount of said materials in the range of 10–2000 mg materials of the stated group per liter of sparkling wine. Specially preferred is a sparkling wine having a total content of amino acids and amino acid derivatives in the range of 20–200 mg per liter, preferably in the range of 100 to 1000 mg per liter of sparkling wine and/or a total content of thiamine of 20–200 $\mu$g per liter, preferably 50 to 100 $\mu$g per liter, and/or a total content of thiamine pyrophosphate in the range of 20–250 $\mu$g per liter, preferably in the range of 100–200 $\mu$g per liter.

An autolysate of yeast generally has a total content of amino acids of 10% by weight, referred to the weight of the autolysate. Accordingly, if the inventive process is performed, by adding an autolysate of yeast to the starting material for making the sparkling wine or in any step of a process for making a sparkling wine prior to the final bottling of the product, then accordingly there should be added the autolysate of yeast in such a quantity that 0.5 g to 1.5 g of autolysate are added per liter of sparkling wine, and an especially preferred amount being about 1 g of yeast autolysate per liter of sparkling wine. If e.g. the sparkling wine is produced by performing a secondary fermentation according to the process of a tank fermentation, and if a pressure tank is used having a capacity of 20,000 liters, then to the blend of wines or to the produced raw sparkling wine, there should be added about 20 kg of autolysate of yeast.

Thiamine and thiamine pyrophosphoric acid salt act as co-enzyme, when certain substances present in the wine or in the sparkling wine certain substances present in the wine or in the sparkling wine are decarboxylated. If therefore the inventive process is performed by adding thiamine and/or thiamine pyrophosphoric acid salt, then it can be assumed that said additives accelerate reactions by which amino acids or ketocarboxylic acids and other substances present in the sparkling wine are converted during the ageing of the sparkling wine into aldehydes. Aldehydes are some of the most active flavouring components of the total flavour of a sparkling wine. Perhaps said kind of reactions are the reason why the flavour of sparkling wines according to the inventive process can be improved by adding thiamine and/or thiamine pyrophosphoric acid salt.

The invention now will be illustrated by examples.

EXAMPLE 1

Production of a sparkling wine according to the tank fermentation process

Into a pressure tank there were introduced 20,000 liters of a wine blend, and in the usually way the tirage of yeast and sucrose was added. A vertically standing tank was used which was provided with an agitator and furthermore a water jacket. During the secondary fermentation the temperature in the tank was maintained in the range of 18.9°–19.2° C. by heating or cooling with the water jacket.

The produced raw sparkling wine was kept into contact with the yeast for a total period of 60 days. Thereafter, 18.7 kg of yeast autolysate were added and furthermore also a brandy saturated with sucrose, i.e. the dosage, was introduced into the sparkling wine. Thereafter, the yeast is removed in the usual way, i.e. by filtration applying a counter pressure and performing said filtration in the usual way the bottles were filled with the sparkling wine also applying a counter pressure and finally the bottles were closed using a special cork.

As test for comparison, the above outlined process was repeated using the same amount of tirage and dosage and also the same conditions during the fermentation. However after the 60 days period, only the dosage was added however no autolysate of yeast.

The bottles of sparkling wine produced according to the inventive process and also the control bottles were aged under the same conditions for 3 month. Thereafter, a group of 10 persons tested the sparkling wine produced according to the inventive process and also the control bottles. All of the persons qualified the flavour and also the mousseux of the sparkling wine produced according to the inventive process as being superior to the sparkling wine of the control.

EXAMPLE 2

Preparation of a sparkling wine according to the carbonation process.

To 100 liters of a blend of wine 1 kg of yeast autolysate was added. The material was aged for 2 days, thereafter a mixture of brandy and sugar was added, the wine clarified by filtration and impregnated with carbon dioxide gas to a pressure of 4.5 atm. The bottling of the product was performed in the usual way and the bottles aged for 2 month. After this time, the bottles were tested and the flavour and also the mousseux of the so produced sparkling wine was of a quality resembling to the one of champagne produced according to the traditional champagne method.

What is claimed is:

1. A process for improving the flavor and the mousseux of sparkling wines containing a permanent visible excess of carbon dioxide, in which after the alcoholic fermentation step in the preparation of the sparkling wine there is added a mixture of two components: (1) a product which comprises at least one amino acid or amino acid derivative, and (2) either one or both of thiamine and thiamine pyrophosphoric acid salt.

2. A process as defined in claim 1, wherein said product which comprises the amino acid or amino acid derivative is the product of the hydrolysis of a protein containing material comprising amino acids, dipeptides and polypeptide.

3. A process as defined in claim 1, wherein said mixture is an autolysate of yeasts.

4. A process as defined in claim 1, wherein the amino acid is lysine, aspartic acid, glutamic acid, alanine, valine or a mixture of two or more such amino acids, or a mixture of amino acids which comprises at least one of said amino acids.

5. A process as defined in claim 4, wherein the amino acid is glutamic acid or a mixture of two or more amino acids which comprises glutamic acid.

6. A process as defined in claim 1, wherein the sparkling wine is prepared by performing the following steps:
   (a) to wines or a blend of wines which were produced by an alcoholic primary fermentation of musts, there is added yeast and sucrose or invert sugar,
   (b) the resulting mixture is submitted to a secondary fermentation of sugar in a sealed container, so that the carbon dioxide which is formed by said secondary fermentation remains in the wine,
   (c) the yeast is removed from the wine, maintaining essentially the carbon dioxide content of the wine, and wherein before or after the removal of the yeast there is added a dosage of sugar and alcohol together with said mixture of two components and the sparkling wine contained in a bottle or bottled under pressure is finally closed.

7. A process as claimed in claim 6, in which the sparkling wine is produced according to the champagne-method by adding to the wines or the blend of wines said yeast and sugar, performing the secondary fermentation in closed bottles during a fermentation period of at least 60 days, placing the bottles in special racks shaking and twisting, the bottles being declined so that by gravity the yeast deposits gradually downward into the neck of the bottle and onto the bottle stopper and the removal of the yeast deposit is achieved by opening the bottom stopper whereby the yeast deposit is ejected by the pressure which has developed in the bottle, adding said dosage of sucrose and ethanol, together with said mixture of two components and closing the bottles finally.

8. A process as claimed in claim 6, wherein the sparkling wine is produced according to the transvasing-process by adding to the wines or the blend of wines said mixture of yeast and sugar, performing the secondary fermentation in closed bottles during a fermentation period of 6-8 weeks, adding after said secondary fermentation said dosage of sucrose and ethanol together with said mixture of two components removing the yeasts by filtration performed under counterpressure and filling the resulting sparkling wine into new bottles which are then finally closed.

9. A process as claimed in claim 6, in which the sparkling wine is produced according to the tank-fermentation process by adding to the wines or the blend of wines said mixture of yeast and sugar and performing the secondary fermentation in a closed pressure tank in which the contents are optionally stirred in which process after the fermentation there is added a dosage of sucrose and ethanol together with said mixture of two components, the yeast is removed by filtration under counter-pressure, the sparkling wine is filled into the bottles and the bottles are finally closed.

10. A process as claimed in claim 1, wherein the sparkling wine is prepared according to the carbonation process by adding said mixture of two components to the wines or a mixture of wines produced by an alcoholic primary fermentation of musts and furthermore adding a liquid conaining sucrose and/or ethanol, pressing carbon dioxide gas into the wine and filling the resulting sparkling wine into the bottles which are finally closed.

11. A process as defined in claim 10, wherein prior to the carbonation with the carbon dioxide gas the wine is filtered.

12. A process as defined in claim 1, in which the produced sparkling wine is a crackling wine, in which process the alcoholic primary fermentation of the musts is performed in a pressure tank so that the carbon dioxide which is developed during the primary fermentation cannot escape from the resulting wine, which after the primary fermentation is filtered and filled into the bottles which are finally closed, in which process the mixture of two components is added prior to the filling of the sparkling wine into the bottles and prior to filtration.

13. A process as claimed in claim 1, in which the mixture of two components is added in such a quantity that the prepared sparkling wines contain 10-2000 mg of said mixture per liter.

14. A process as claimed in claim 13, in which the amino acids and/or amino acid derivatives are added in such a quantity that the finally resulting sparkling wine contains 20-2000 mg amino acids and/or amino acid derivatives per liter.

15. A process as claimed in claim 13, wherein said thiamine and/or thiamine pyrophosphoric acid salt are added in such a quantity that one liter of the finally resulting sparkling wine contains 20-100 µg thiamine or 20-250 mg thiamine pyrophosphoric acid salt or both.

16. A process as claimed in claim 13, wherein the process is performed by adding as said mixture of two components an autolysate of yeasts, said autolysate having a total content of amino acids of about 10% by weight on the basis of the total weight of the autolysate, wherein the autolysate of yeasts is added in such a quantity that the finally resulting sparkling wine comprises 0.5 to 1.5 g of autolysate per liter sparkling wine.

17. A process as claimed in claim 14, in which component (1) contains 50 to 80% by weight of glutamic acid.

* * * * *